United States Patent [19]

McGarrah

[11] Patent Number: 5,117,863
[45] Date of Patent: Jun. 2, 1992

[54] BACKFLOW VALVE

[75] Inventor: Robert G. McGarrah, Brookfield, Conn.

[73] Assignee: PepsiCo Inc., Purchase, N.Y.

[21] Appl. No.: 670,962

[22] Filed: Mar. 18, 1991

[51] Int. Cl.$^5$ .................... F16K 37/00; F16K 15/14
[52] U.S. Cl. .................................... 137/559; 137/846
[58] Field of Search ............... 137/559, 846, 852, 859

[56] References Cited

U.S. PATENT DOCUMENTS

| | | | |
|---|---|---|---|
| Re. 27,399 | 6/1972 | Urso | 137/512.15 |
| 2,328,382 | 8/1943 | Langdon | 137/846 X |
| 2,388,432 | 11/1945 | Nelson | 137/559 |
| 2,675,823 | 4/1954 | Langdon | 137/218 |
| 2,867,213 | 1/1959 | Thomas, Jr. | 137/559 X |
| 3,122,156 | 2/1964 | Kersch | 137/218 |
| 3,131,716 | 5/1964 | Griswold et al. | 137/559 X |
| 3,417,775 | 12/1968 | Smith | 137/218 |
| 3,556,122 | 1/1971 | Laerdal | 137/559 X |
| 3,601,152 | 8/1971 | Kenworthy | 137/559 X |
| 3,747,621 | 7/1973 | Tine | 137/218 |
| 3,850,190 | 11/1974 | Carlson | 137/218 |
| 3,857,277 | 12/1974 | Moore | 137/559 X |
| 4,013,089 | 3/1977 | Braukmann | 137/218 |
| 4,022,245 | 5/1977 | Davis | 137/559 |
| 4,159,025 | 6/1979 | Harthun | 137/218 X |
| 4,474,209 | 10/1984 | Akhtarekhavari | 137/559 |
| 4,506,694 | 3/1985 | Daghe et al. | 137/218 |
| 4,566,612 | 1/1986 | von Kreuter | 137/846 X |
| 4,646,775 | 3/1987 | Traylor | 137/218 |
| 4,726,390 | 2/1988 | Franklin | 137/859 X |
| 4,827,973 | 5/1989 | Boehmer | 137/559 X |

FOREIGN PATENT DOCUMENTS 983796 2/1965 United Kingdom .............. 137/559

Primary Examiner—John Rivell
Attorney, Agent, or Firm—Scully, Scott, Murphy & Presser

[57] ABSTRACT

A backflow valve for use in a post-mix carbonator system for preventing the backflow of carbonated fluid, thereby preventing the contamination of the fresh water supply, and indicating when such a backflow condition exists or has occurred. The backflow valve comprises a check seat body which houses an elastomeric valve member, and a sight glass body for viewing the position of the elastomeric valve member. The backflow valve also comprises top and base connectors for connecting the backflow valve to the fluid carrying line and a shut-off/flush valve for controlling the flow of fluid through the device. The elastomeric valve member allows the flow of fluid from the supply to the outlet when the fluid pressure at the supply exceeds the pressure at the outlet and prevents the reverse flow of fluid when the pressure at the outlet exceeds the pressure at the supply. As the pressure at the outlet increases, the elastomeric valve member is forced in the upstream direction over a plurality of steps in the check seat body. As the elastomeric valve member passes over each step, it engages the step and is thereby prevented from returning to its original viewed downstream position. The position of the elastomeric valve member may be through the sight glass body which has a line demarking the normal position of the elastomeric valve member.

14 Claims, 2 Drawing Sheets

5,117,863

BACKFLOW VALVE

BACKGROUND OF THE INVENTION

1. Field of the Invention

This invention relates to a means for preventing the backflow of fluid, such as water, from a downstream outlet to an upstream supply, and more particularly, to a backflow valve designed to prevent the flow of carbonated water from soft drink dispensers into the fresh water supply systems for the soft drink dispensers, and to indicate that a backflow condition has occurred, or currently exists in the system.

2. Discussion of the Prior Art

Beverage postmix carbonators have been known to leak carbon dioxide, $CO_2$, back into the fresh water supply lines that feed the dispenser. The presence of carbon dioxide can acidify the water in supply lines, and if the supply lines are made of copper, the acid will leach copper or copper compounds into the water supply. When the carbonator recycles, some of the contaminated water can be drawn into the beverage dispensing system. The result, depending on the concentration of copper in the water and other conditions, will result in an off-taste and in extremely high concentrations, nausea and vomiting of those who consume the contaminated beverage. In addition, the contaminated water can also be drawn into other beverage dispensers operating from the same water supply or can be consumed through drinking fountains utilizing the same water supply.

The adverse health effects of drinking water or carbonated water which contains copper are fleeting, even in the highest concentrations which result in nausea and vomiting. The effect of copper ingestion on an individual should last at most a few hours, and there are no known instances of death or ongoing distress. Copper and its compounds are often found in water and are not considered toxic, but rather, they are considered irritants.

One known cause for $CO_2$ backflow into fresh water or potable liquid supply lines is a sudden pressure drop in the main supply line, coupled with the failure of the check valves at the water inlet of the carbonator. For this reason, double check valves are normally specified for potable water applications. Failure events in a double check valve occur only very infrequently, and thus far, a failure condition in the valves has been impossible to duplicate in the laboratory or in the field. On rare occasions, however, examination of a failed double check valve show that the conventional strainers or filters utilized in the valve assembly have failed allowing particles to enter and lodge in the check valve. The lodged particles can therefore hold the check valve open, which results in a backflow condition.

Although there is a tendency to blame copper contamination on the failure of the check valves, there are a variety of other conditions that exist that can cause the contamination problem. One such condition is that of the excessive use of solder flux when assembling the copper piping utilized in the system. The excess use of solder flux can result in localized acidity in the copper line thereby resulting in the same leaching condition as caused by carbonation backflow. A second condition that can cause the contamination problem is the use of naturally acidic water, that is, water with a pH less than 7. Depending on the degree of acidity, such water can leach copper directly from copper pipes, even when no carbon dioxide is present. There are some water supplies which can have acid conditions which can range to unusually low pH values. New York City water, for example, has ranged as low as a pH level of 5, which is 100 times more acid than neutral. A related problem to low pH water is soft water. In a soft water condition, the addition of chlorine can result in wild fluctuations in acidity, and as stated previously, such conditions can result in contamination problems from direct leaching. A third cause of the problem can be excessive chlorination. Some municipalities, Washington D.C. for example, demand that new plumbing, including replacement parts, be chlorinated for twenty-four hours before use after installation is complete. This excessive chlorination procedure can also lead to acidic water conditions and resultant copper leaching.

Although there are other possible causes of copper contamination as discussed above, the carbonation backflow cause is one that can be prevented locally. There are several techniques employed to prevent carbonation backflow in soft drink dispensers or post mix carbonators. One such technique is the indirect fill method. In the indirect fill method, which is used on all post mix cup vendors, water is drawn from a reservoir to supply the carbonator. The reservoir is filled with water through a solenoid valve that is controlled by the level of water in the reservoir. Although preventing carbonation backflow, this system provides an opportunity for microbiological build-up if regular maintenance and cleaning of the reservoir are neglected. For this reason, vending operators need regular and frequent sanitizing of the water systems in postmix cup vendors in spite of the relatively protected environment within the vendors. To use an indirect water supply for conventional postmix systems would lead to almost impossible sanitizing tasks because of the environmental conditions in the average dispensing location.

A second technique makes use of solenoid valves in addition to check valves at the inlet to carbonators. The use of solenoid valves prevents carbonator backflow, however, as in the indirect fill method, this technique can lead to microbiological contamination or water leak back. The problem arises because the solenoid valve needs a few milliseconds to close, and it is during this time period that the leak back occurs.

A third technique makes use of vented check valves. Vented check valves are devices which are intended to open if back-pressure, becomes higher than line pressure for any reason. There are several varieties of these vented valves using diaphragms, flexible seals or pistons designed to produce an opening-to-atmosphere effect. All of the vented devices depend on the reliability of a check valve to operate and thus vented check valves are no more reliable than conventional double ball check valves. In addition, because of their design, they are less self-cleaning than conventional check valves because the velocity of water passing through them is much slower.

In the patent art, there are a variety of backflow preventers for regulating the reverse flow of liquid, although not necessarily in beverage dispensing machines. In U.S. Pat. No. 4,646,775, Traylor discloses a vacuum breaker for connection in the discharge line of a source of liquid. This patent also discloses an upstream backflow preventer. The backflow preventer comprises a central nozzle portion made out of a resilient material and which is mounted in the discharge line. The nozzle portion of the backflow preventer diminishes in cross-section in a downstream direction. Under normal operating conditions, a flow of liquid under pressure enters the backflow preventer and forces the nozzle open. If there is a pressure build-up on the downstream side of the nozzle, then the downstream extremity of the nozzle closes and prevents water flow in the upstream direction.

In U.S. Pat. No. 3,417,775, Smith discloses a vacuum breaker device having a backflow preventer incorporated therein for preventing the backflow of fluid therethrough. The backflow preventer comprises a diverging type nozzle made of a resilient type material. When the pressure upstream is greater than the pressure downstream, normal operating conditions, the nozzle is substantially open and fluid flows through easily. However, when the pressure downstream is greater than the pressure upstream, the nozzle portion expands and seals off the water flow paths.

In U.S. Pat. No. 3,122,156, Kersch discloses a flexible check valve/anti-siphon device. The check valve controls the reverse flow of a fluid, whether it be a liquid or gas, in a particular flow line. The check valve is conically shaped and made of resilient material. Under normal operating conditions, the fluid pressure upstream of the check valve forces the valve to open and fluid readily flows therethrough. When the pressure downstream of the valve builds to a point where it is greater than the pressure upstream, the check valve moves or deflects thereby forcing the peripheral edge of the conical portion radially outward against the inside surface of the flow line thus sealing off the line.

SUMMARY OF THE INVENTION

The present invention is directed to a backflow valve for use in a potable fluid-carrying conduit. The backflow valve allows fluid flow in a first direction and prevents fluid flow in a second direction. In the event the pressure on the downstream side rises to a predetermined level, or if backflow begins, the valve will simultaneously indicate that a backflow condition has occurred. The backflow valve comprises a substantially cylindrical body defining an elongate interior chamber having an inlet at its upstream portion and an outlet at its downstream portion. The substantially cylindrical body comprises a check seat body which forms the upstream portion of the cylindrical body, the check seat body having at least one annular step extending inwardly from the inner surface of the check seat body, and a sight glass body formed in the check seat body. The sight glass body is formed of a transparent material. Disposed within the check seat body and the sight glass body is an elastomeric valve member, the elastomeric valve member having a base which is slidably disposed within the check seat body and engaging the one annular step, and a pair of sealing members generally equally spaced and converging in a downstream direction, the sealing members allowing fluid flow substantially unrestricted from the upstream portion to the downstream portion of the backflow valve. The backflow valve further comprises a top connector for connecting the backflow valve to the outlet side of the fluid-carrying conduit, and a base connector for connecting the backflow valve to the supply side of the fluid-carrying conduit, and a shut-off/flush valve assembly for preventing the flow of fluid through the backflow valve during service or exchange.

The backflow valve is typically used in systems utilizing a potable fluid supply and in which the integrity of the supply is to be maintained by effectively insulating the supply from contamination due to a reverse flow of fluid. One such system is a soft drink dispensing machine. The fresh water supply must be isolated from carbon dioxide carbonated water used to make the soda must be prevented from entering the fresh water supply. If the fresh water supply becomes acidic from carbonation backflow, copper from the supply lines may leach into the water thereby resulting in possible copper contamination of the soft drink dispensing machine.

Under normal operating conditions fresh water from the supply or reservoir flows under pressure into the backflow valve and continues on to the soft drink dispensing machine. Water enters the backflow valve at the shut-off/flush valve assembly which is normally in the open position. The water then enters the base connector means which serves to decrease the velocity of the water flow such that any debris in the water may settle out of suspension. The water then enters the main portion of the backflow valve which comprises the check seat body and the sight glass body. Disposed within this region is the elastomeric valve means. The elastomeric valve means comprises two flexible duck-billed wall members which converge in the downstream direction. These duck-billed wall members open and allow the flow of water from the supply to pass through substantially unrestricted. In the case of a backflow condition, where the pressure at the outlet exceeds the pressure at the supply, the duck-billed walls are forced closed and thereby prevent the flow of fluid in the upstream direction. When the duck-billed walls are closed and the flow of water is restricted in the upstream direction, any substantial increase in the backflow pressure will force the elastomeric valve member downwardly through the check seat body in an upstream direction over a series of steps extending inwardly from the inner surface of the check seat body. These steps allow for only upstream travel of the elastomeric member. Once the elastomeric valve member is below a protruding step, it must be manually reset to its initial position. The sight glass body is transparent and thus it can be readily seen by an observer that the elastomeric valve member has moved in the upstream direction, thereby indicating that a backflow condition has occurred. This is made more readily observable by providing the sight glass body with an indication line demarking the normal position of the elastomeric valve member, i.e. no backflow condition. When a backflow condition is detected, the shut-off/flush valve is turned to the off position, thereby preventing the flow of water through backflow valve. With the shut-off/flush valve in the off position, maintenance personnel can locate and repair the problem. If the carbonation unit has malfunctioned to cause the increase in pressure in the downstream portion of the system, then the maintenance personnel can service the unit, and then reset the elastomeric valve member to its normal operating position.

If there is no backflow condition, the water continues to flow through the sight glass body into the top connector. The top connector is shaped in such a way as to increase the velocity of water flow to substantially the same velocity as it had when it entered the backflow valve.

The backflow valve of the present invention provides a means and method for preventing the backflow of fluid into the supply and indicating when such a backflow condition has occurred. The backflow valve provides a means for routine visible sight checks by maintenance personnel as well as health inspectors to determine if a backflow condition has occurred or currently exists. The backflow valve is a light weight device which is easily connected to any fluid carrying line and is also easily removed therefrom. Servicing of the backflow valve does not require a service call. The backflow valve also has a shut-off/flush valve to prevent possible flooding damage.

DETAILED DESCRIPTION OF THE PREFERRED EMBODIMENTS

Figure 1:
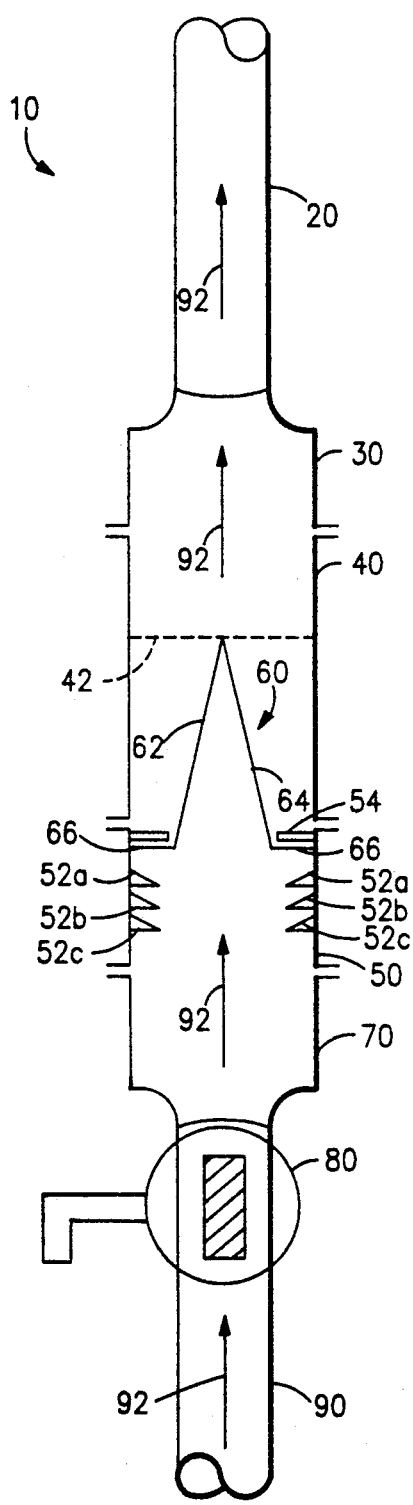
FIG. 1 is a diagram of the backflow valve of the present invention under normal operating conditions.

Referring to FIG. 1, there is shown the backflow valve 10 of the present invention. As is shown in the figure, the backflow valve 10 comprises a top connector 30, a sight glass body 40, a check seat body 50, an elastomeric valve means 60 disposed within the check seat body 50 and the sight glass body 40, a base connector 70, and a shut-off/flush valve assembly 80. The backflow valve 10 is installed in line with a fluid-carrying line. The fluid-carrying line is part of a larger system comprising a source of fluid and a sink or outlet for the fluid. The upstream portion of the backflow valve 10 is connected to the supply side 90 of the fluid carrying conduit right below the shut off/flush valve assembly 80 and the downstream portion of the backflow valve 10 is connected to the outlet side 20 of the fluid carrying line at the top connector 30. A complete description of each part comprising the backflow valve 10 and its corresponding function will be provided hereinbelow. In particular, the backflow valve 10 will be described as it operates under varying pressure conditions; namely, a normal operation pressure condition wherein the pressure upstream exceeds the pressure downstream and a backflow pressure condition wherein the pressure downstream exceeds the pressure upstream. For purposes of describing the operation of the backflow valve 10, the terms upstream and downstream will be used as relative terms to describe parts of the backflow valve 10 as being either proximate to the supply or proximate to the outlet. For example, the base connector 70 is downstream of the shut-off valve assembly 80, but upstream from the check seat body 50.

In the preferred embodiment, potable fluid such as fresh water, flows through the backflow valve 10 in the direction shown by the arrows 92. As illustrated in FIG. 1, the water flows from the supply side 90 of the fluid-carrying line through the backflow valve 10 and finally through the outlet side 20 of the fluid carrying conduit to the outlet (not shown). The fluid carrying conduit could be constructed from any suitable, FDA approved potable liquid supply line material. In a typical supply/outlet system embodiment, the use of the backflow valve 10 would be to prevent the backflow of carbonated water from soft drink dispensers into the fresh water supply systems for the soft drink dispensers.

The fresh water flows in the direction of the arrows 92 because the fluid pressure at the supply exceeds the fluid pressure at the outlet. This condition is the normal operating condition of any supply/outlet system. When for some reason, the fluid pressure at the outlet side becomes greater than the fluid pressure at the supply side, then the direction of water flow could reverse. This reversal of fluid flow is commonly referred to as a backflow condition and as stated previously can lead to possible contamination problems.

Fresh water from the fresh water supply flows under pressure through the fluid carrying conduit, exits the supply side 90 of the conduit and enters the shut-off/flush valve assembly 80 region of the backflow valve 10. As is shown in FIG. 1, both the shut-off/flush valve assembly 80 and the fluid carrying conduit have approximately equal diameters and thus no fluid pressure or velocity change occurs at this region. Fluid pressure and velocity changes in the system do occur at specific locations and for specific reasons, and these specific locations and regions shall be described subsequently. The shut-off/flush valve assembly 80 is normally in the open position thereby allowing essentially unrestricted water flow through the backflow valve 10. The shut-off/flush valve assembly 80 is incorporated primarily to facilitate the servicing of, and the periodic cleaning of the backflow valve 10 unit. For example, by closing the shut-off/flush valve assembly 80, water flow through the backflow valve 10 is interrupted and any debris that has accumulated in the backflow valve 10 can be removed and if necessary a part or parts of the backflow valve 10 can be serviced or replaced. In addition, when a backflow condition exists, the flow of water from conduit 90 must be interrupted to locate and service the problem as well as to reset the elastomeric valve member 60. A complete description of the backflow condition is given in subsequent paragraphs as well as a detailed description of the operation of the elastomeric valve member 60. The shut-off/flush valve assembly 80 can be formed of any suitable plastic type material such as PVC, LEXAN ®, PLEXIGLASS ® or acrylic type compounds, and may be attached to the base connector 70 by electronic/ultrasonic welding methods. The supply side 90 of the fluid-carrying line is connected to the shut-off/flush valve assembly 80 via a union or any other suitable means which would allow easy removal of the backflow valve 10.

As the flow of water exits the shut off/flush valve assembly 80, it enters the upstream region of the backflow valve 10 at the base connector 70. Formed from the same material as the shut-off/flush valve assembly 80 described above, the base connector 70 primarily functions to connect the backflow valve 10 to the fluid-carrying line via the shut-off/flush valve assembly 80 and to reduce the velocity, of the fluid flow as it enters the main portion of the backflow valve 10. To facilitate the decrease in fluid flow velocity the base connector 70 is shaped with a truncated conic section as shown in FIG. 1. The decrease in velocity allows debris trapped or suspended in the flowing water to settle out and collect in the base of backflow valve 10. This debris can then be removed during maintenance cycles or periods and therefore possibly prevent damage to the supply/outlet system which in this example is a soft drink dispensing machine.

The water flowing through the base connector 70 now enters the check seat body 50 portion of the backflow valve 10. The check seat body 50 is a substantially cylindrical structure that defines the upstream portion of the elongate cylindrical chamber formed from the check seat body 50 and the sight glass body 40. The base connector 70 and the check seat body 50 are check connected by any one of a variety of means including a threaded union, clamps, one quarter turn "ears" flanges or any other suitable means that allow the expeditious separation of the two sections. Having a separable union at this junction allows for routine maintenance to be done on the backflow valve 10 without having to replace any parts or requiring specialized tools.

Protruding from the inner surface of the check seat body 50 are a plurality of steps 52a, b, and c. These steps 52a, b, and c function to allow the elastomeric valve means to engage the check seat body 50 when a backflow pressure condition exists. Specifically, the steps are configured to allow the elastomeric valve means 60 to move upstream and incrementally pass over and engage each step 52a, b, and c in accordance with the backflow pressure differential between the upstream portion of the backflow valve 10, and the downstream portion of the backflow valve 10. The steps 52 are angled downward from the plane of the check seat body 50 inner surface to facilitate the movement of the elastomeric valve member 60 downward over the steps 52a, b, and c, but restrict upward movement once the elastomeric valve member 60 has dropped down past a particular step 52a, b, and c. In the preferred embodiment, each step 52a, b, and c is an annular protrusion integrally formed along the check seat body inner surface. The annular protrusion is configured as a downwardly sloped O-ring. The number of steps 52a, b, and c can be determined by the length of the check seat body 50 and the number of incremental steps desired over the chosen pressure differential between the normal operating condition and a backflow condition. The check seat body 50 comprising steps 52a, b, and c can be formed of clear PLEXIGLASS®, acrylic, or molded or machined LEXAN®, and is connected to the sight glass body 40 in the same way that the check seat body 50 is connected to the base connector 70. Utilizing a separable union at this junction also allows for the expeditious separation of the two parts.

The transparent sight glass body 40 is generally cylindrical in shape with a diameter approximately equal to that of the check seat body 50. In the preferred embodiment, an indicating line 42 is etched along the circumference of the sight glass body 40 at a predetermined location. Any other suitable way to establish an indicating line 42 on sight glass body 40, such as a decal, would be acceptable. The indicating line 42 is used to provide a reference line for the normal position of the tip of elastomeric member 60. The description below will set forth how sight glass body 40, indicating line 42, and elastomeric member 60 function to indicate when a backflow pressure condition exists in the backflow valve 10. A further detailed description of the check seat body 50 and steps 52a, b, and c will also be described below.

The elastomeric valve member 60 comprises two duck-billed wall members 62 and 64, and a substantially cylindrical base 66 having a diameter slightly less than that of the check seat body 50. The cylindrical base 66 is of slightly less diameter than the check seat body 50 to facilitate movement with respect thereto, but large enough in diameter to form an air and water tight seal up to a pressure of approximately 150 psi. The base region of the elastomeric valve member 60 is disposed within the check seat body 50 and the upper region of the elastomeric valve member 60 is disposed within the sight glass body 40. The elastomeric valve member 60 is disposed in such a way that during normal operating conditions, the tip of the elastomeric valve member 60 is at a height equal to the plane of the indicator line 42 of the sight glass body 40. The elastomeric valve member 60 is formed of a flexible type of rubber such as E.D.P.M. or a santoprene elastomer. The cylindrical base 66 of the elastomeric valve member 60 is a horizontal rim that performs several functions. The first function of the base 66 is to form the above mentioned air and water tight seal. Additionally, and related to the seal function, is the stabilizing function of the base 66. The base 66 holds the elastomeric valve member 60 in a central stable position within both the check seat body 50 and the sight glass body 40. The second function of the base 66 is to pass over and engage the protruding annular steps 52a, b, and c when a backflow pressure condition forces the elastomeric valve member 60 in the upstream direction. Once the base 66 passes over a given step 52a, b, and c, the horizontal rim is prevented from moving downstream due to the shape of the protruding steps 52a, b, and c. Thirdly, the base 66 engages a rim protrusion 54 which is part of the upstream portion of the check seat body 50. This rim protrusion 54 extends circumferentially around the check seat body 50 and prevents the fluid pressure of normal operating conditions to force the elastomeric valve member 60 in a downstream direction such that the elastomeric valve member 60 would be unduly disposed within the sight glass body 40.

Figure 2:
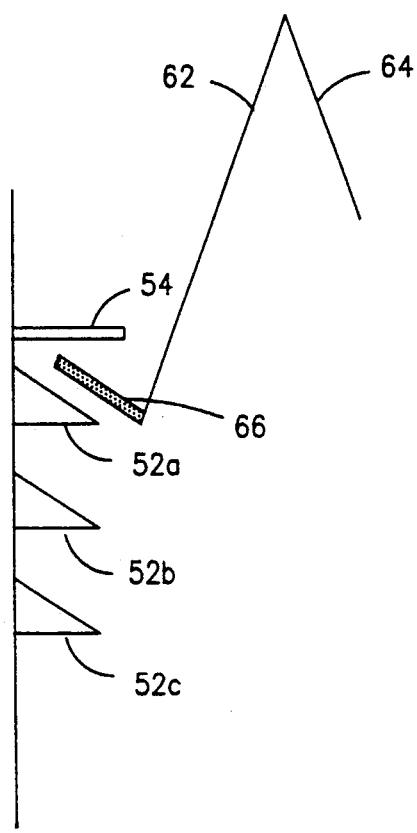
FIG. 2 is a detailed diagram illustrating the deflection of the base of the elastomeric valve member as it passes over a step protruding from the inner surface of the check seat body of the backflow valve.
Figure 3:
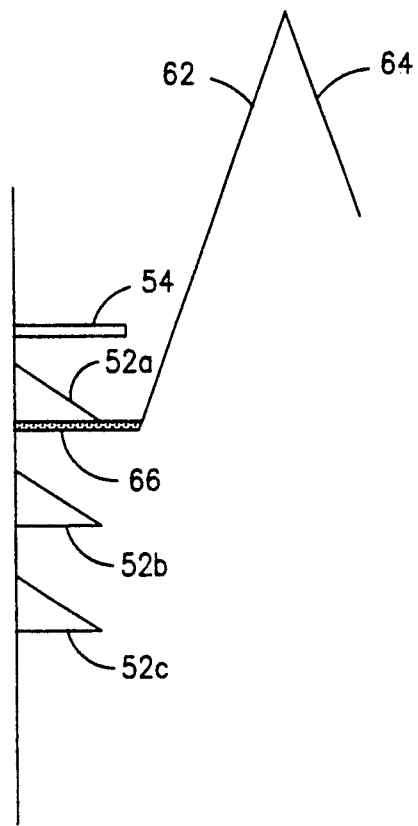
FIG. 3 is a detailed diagram illustrating the engagement of the base of the elastomeric valve member to the check seat body once the base passes over the step.

During normal operating conditions, the elastomeric valve members' 60 duck-billed wall members 62 and 64 are substantially open allowing potable liquid flow therethrough. The duck-billed wall members 62 and 64 of the elastomeric valve member 60 are shown in FIG. 1 as converging in the downstream direction, at a particular angle, relative to its substantially cylindrical base 66. This is for illustrative purposes only. Under normal operating conditions, these wall members 62 and 64 are forced open by water pressure from the source and water flows therethrough substantially unrestricted. When a backflow pressure condition exists, i.e., when the pressure in the downstream portion of the backflow valve 10 is greater than the pressure in the upstream portion, the duck-billed walls 62 and 64 are forced closed to prevent water flow in the upstream direction through the backflow valve 10. As the backflow pressure increases, the elastomeric valve member 60 is forced upstream through the check seat body 50. The horizontal rim which is the base 66 of the elastomeric valve member 60 will begin to pass over the first of the series of steps 52a, b, and c of the check seat body 50. Since the horizontal flap is flexible, it readily passes over the downwardly sloped step 52a as illustrated in detail in FIG. 2. The "one-way" shape of the step 52a is such that once the horizontal flap which forms the base 66 of the elastomeric valve member 60 completely passes over it, any downstream movement of elastomeric valve member 60 is restricted. FIG. 3 illustrates the horizontal flap after it has passed over step 52a.

Figure 4:
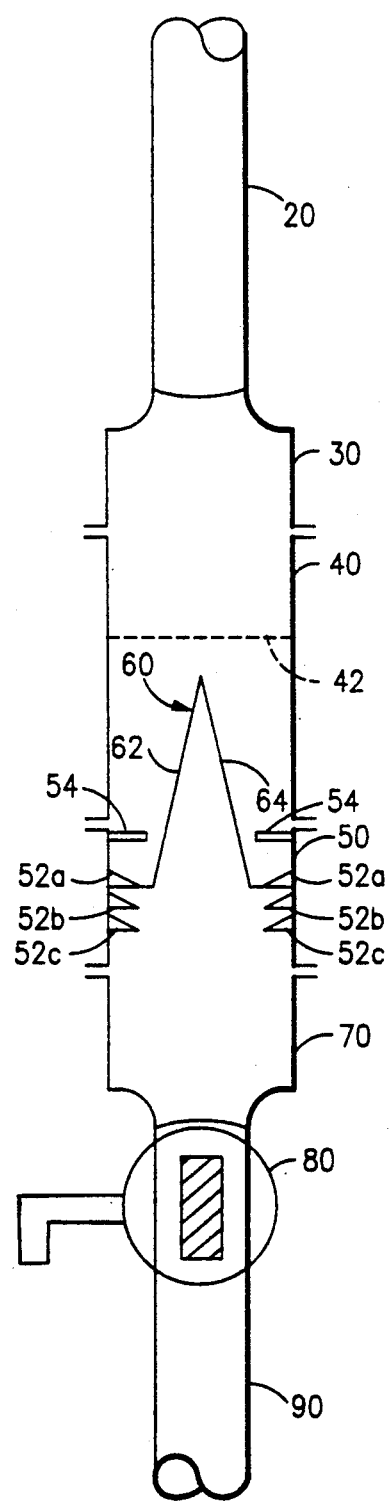
FIG. 4 is a diagram of the backflow valve of the present invention under a backflow condition.

The indication of a backflow condition in the backflow valve 10 occurs once the horizontal flap 66 of the elastomeric valve member 60 passes over the first step 52a in the check seat body 50. When the backflow pressure is sufficient to force elastomeric valve member 60 in the upstream direction, and cause the horizontal base 66 to pass over the first step 52a of check seat body 50, the top portion of the elastomeric valve member 60 will have fallen below the indicator line 42 of the sight glass body 40. FIG. 4 illustrates the position of the elastomeric valve member 60 when a backflow pressure condition has occurred or currently exists. It is readily observable to any one inspecting or servicing the water supply system that a backflow pressure condition has existed once the elastomeric valve member 60 has fallen below indicator line 42 in sight glass body 40. If the backflow condition is repeated, the elastomeric valve member 60 is urged further upstream where it will eventually pass over and engage the second step 52b in the check seat body 50. The top portion of the elastomeric valve member 60 will then be further below the indicator line 42 by a corresponding distance between the first and second steps 52a and b. In the preferred embodiment, a backflow pressure of 10 psi±2 psi will cause the elastomeric member to flex sufficiently to pass over one of the stepped seats.

In the preferred embodiment, backflow valve 10 can withstand a backflow pressure of approximately 150 psi. The backflow valve 10 may malfunction or possibly be damaged if the backflow pressure exceeds 150 psi. It is, therefore, recommended that once the elastomeric valve member 60 has fallen below indicator line 42, the shut-off/flush valve 80 be turned off to prevent possible backflow valve 10 malfunction and possible water flow through backflow valve 10 in the upstream direction. Thereafter, the backflow valve 10 and/or the water supply system should be serviced or checked to find the cause of the backflow condition and to rectify the problem. Typically, the unit must be disassembled and reset after the backflow condition problem has been resolved.

The top connector 30 is connected to the downstream portion of the sight glass body 40 and is formed of any suitable plastic such as PVC, acrylic, LEXAN ® or PLEXIGLASS ®, and it functions to connect the backflow preventer/indicator 10 to the outlet side 20 of the fluid carrying conduit. Specifically, the top connector 30 is connected to the fluid carrying conduit 20 by means of a union or a clamp. The top connector 30 is connected to the sight glass body 40 at its upstream end and connected to conduit at its downstream end. It is important to note that the top connector 30 is also shaped as a truncated conic section to accommodate the difference in diameter between the fluid carrying conduit and sight glass body 40 structures. Additionally, the conic shape with a reduced diameter further downstream functions to increase the velocity of the water to essentially the same velocity at which it entered the backflow valve 10.

While the invention has been particularly shown and described with respect to preferred embodiments thereof, it will be understood by those skilled in the art that the foregoing and other changes in form and details may be made therein without departing from the spirit and scope of the invention, which should be limited only by the scope of the appended claims.

What is claimed is:

1. A backflow valve for use in a potable fluid delivery system, said backflow valve allowing fluid flow in a first direction and preventing fluid flow in a second direction while simultaneously indicating a backflow condition, said backflow valve comprising:
   (a) a substantially cylindrical body defining an elongate interior chamber having an inlet at its upstream portion and an outlet at its downstream portion, said substantially cylindrical body having a check seat body, said check seat body having at least one annular step extending inwardly from the inner surface of said check said body,
   (b) an elastomeric valve member disposed within said check seat body adjacent said step, said elastomeric valve member comprising a base which is slidable within said check seat body and engages said at least one annular step, and a pair of sealing members which are disposed within said cylindrical body and converge in a downstream direction to provide one-way fluid flow, from the upstream portion to the downstream portion of said backflow valve;
   (c) a sight glass means surrounding at least a portion of said elastomeric valve member for observing the position of said elastomeric valve member.

2. The backflow valve according to claim 1, wherein said backflow valve further comprises:
   a first connector means connecting said backflow valve to a fluid conduit, said first connector means connected to a downstream portion of said sight glass body;
   a second connector means removably connected to the upstream portion of said check seat body; and
   a shut off/flush valve assembly connected between the upstream portion of said second connector means and a fluid conduit.

3. The backflow valve according to claim 1, wherein said check seat body comprises an upper ledge protruding circumferentially inward, said upper ledge engaging said base of said elastomeric valve member.

4. The backflow valve according to claim 1, wherein said check seat body further comprises a plurality of annular steps extending inwardly from the inner surface of said check seat body.

5. The backflow valve according to claim 4, wherein said plurality of annular steps extending inwardly from the inner surface of said check seat body are downwardly sloped O-rings, which allow the upstream movement of said elastomeric valve member through said check seat body in response to back pressure therein, and which prevent the return movement of said elastomeric valve member once the base has passed one of said plurality of annular steps.

6. The backflow valve according to claim 1, wherein said pair of sealing members are two flexible duck-billed wall members which converge in a downstream direction to allow the flow of fluid from the upstream portion to the downstream portion of said backflow valve when the fluid pressure upstream exceeds the fluid pressure downstream, and which prevent the flow of fluid from the downstream portion to the upstream portion of said backflow valve when the fluid pressure downstream exceeds the fluid pressure upstream.

7. The backflow valve according to claim 6, wherein said sight glass body further includes an indicator line for marking a normal position for said elastomeric member.

8. The backflow valve according to claim 2, wherein said shut off/flush valve assembly is a manual valve means, which is operable to terminate the flow of fluid to said backflow valve to enable service thereof.

9. A backflow valve for use in a potable fluid delivery system, said backflow valve allowing fluid flow in a first direction and preventing fluid flow in a second direction while simultaneously indicating a backflow condition, said backflow valve comprising:
  (a) a substantially cylindrical body defining an elongate interior chamber having an inlet at its upstream portion and an outlet at its downstream portion, said substantially cylindrical body having:
    a check seat body forming the upstream portion of said cylindrical body, said check seat body having at least one annular step extending inwardly from the inner surface of said check seat body;
    a sight glass body connected to the downstream portion of said check seat body and forming the downstream portion of said cylindrical body, said sight glass body formed of a transparent material; and
  (b) an elastomeric valve member, said elastomeric valve member having a base which is slidably disposed within said check seat body and engaging said at least one annular step, and a pair of sealing members generally equally spaced and converging in a downstream direction, to allow fluid flow, substantially unrestricted, from the upstream portion to the downstream portion of said backflow valve.

10. The backflow valve according to claim 9, wherein said check seat body comprises an upper ledge protruding circumferentially inward, said upper ledge engaging said base of said elastomeric valve member.

11. The backflow valve according to claim 10, wherein said check seat body further comprises a plurality of annular steps extending inwardly from the inner surface of said check seat body below said upper ledge member.

12. The backflow valve according to claim 11, wherein said plurality of annular steps extending inwardly from the inner surface of said check seat body are downwardly sloped O-rings, which allow the upstream movement of said elastomeric valve member through said check seat body in response to a backflow pressure condition and which prevent the downstream movement of said elastomeric valve member once the base of said elastomeric valve member has passed one of said plurality of annular steps.

13. The backflow valve according to claim 12, wherein said pair of sealing members further comprises two flexible duck-billed wall members which converge in a downstream direction, to allow the flow of fluid from the upstream portion to the downstream portion of said backflow valve when the fluid pressure upstream exceeds the fluid pressure downstream, and which close to prevent the flow of fluid from the downstream portion to the upstream portion of said backflow valve when the fluid pressure downstream exceeds the fluid pressure upstream.

14. The backflow valve according to claim 11, wherein said sight glass body includes an indicator line for marking the normal position of the elastomeric member.

* * * * *

UNITED STATES PATENT AND TRADEMARK OFFICE
CERTIFICATE OF CORRECTION

PATENT NO. : 5,117,863

DATED : June 2, 1992

INVENTOR(S) : Robert G. MCGarrah

It is certified that error appears in the above-identified patent and that said Letters Patent is hereby corrected as shown below:

Column 4, line 7: "dioxide carbonated" should read as --dioxide introduced in the carbonation process. Specifically, carbonated--

Column 7, lines 17-18: "valve means" should read as --valve means 60 --.

Column 7, line 32: "cis" should read as --c is--

Column 7, line 40: "ccan" should read as --c can--

Column 7, line 61: "cwill" should read as --c will--

Column 8, line 22: "cwhen" should read as --c when--

Column 8, line 57: "cof" should read as --c of--

Signed and Sealed this

Fourteenth Day of September, 1993

*Attest:*

BRUCE LEHMAN

*Attesting Officer*     Commissioner of Patents and Trademarks